United States Patent
Haneda et al.

(10) Patent No.: US 8,469,415 B2
(45) Date of Patent: Jun. 25, 2013

(54) BUMPER REINFORCEMENT AND BUMPER DEVICE FOR VEHICLE

(75) Inventors: Shinichi Haneda, Anjo (JP); Kiyoichi Kita, Okazaki (JP); Tamaki Ohbayashi, Toyama (JP)

(73) Assignees: Aisin Seiki Kabushiki Kaisha, Kariya-shi, Aichi-ken (JP); Aisin Keikinzoku Kabushiki Kaisha, Imizu-shi, Toyama-ken (JP)

( * ) Notice: Subject to any disclaimer, the term of this patent is extended or adjusted under 35 U.S.C. 154(b) by 38 days.

(21) Appl. No.: 13/137,236

(22) Filed: Jul. 29, 2011

(65) Prior Publication Data
US 2012/0025545 A1 Feb. 2, 2012

(30) Foreign Application Priority Data
Jul. 30, 2010 (JP) .................. 2010-172980

(51) Int. Cl.
*B60R 19/02* (2006.01)

(52) U.S. Cl.
USPC .......................................... 293/102; 293/154

(58) Field of Classification Search
USPC ..... 293/102, 132, 154, 133, 121; 296/187.09, 296/203.02
See application file for complete search history.

(56) References Cited

U.S. PATENT DOCUMENTS

| 4,762,352 | A | 8/1988 | Enomoto |
| 5,395,036 | A | 3/1995 | Sturrus |
| 7,448,658 | B2 | 11/2008 | Takagi et al. |
| 2005/0285416 | A1 | 12/2005 | Heatherington et al. |

FOREIGN PATENT DOCUMENTS

| DE | 10 2006 062 294 | 7/2008 |
| GB | 1587674 | 4/1981 |
| JP | 2000-334530 | 12/2000 |
| JP | 2006-151095 | 6/2006 |
| JP | 2007-38756 | 2/2007 |
| WO | WO 97/27082 | 7/1997 |
| WO | WO 2008/061824 | 5/2008 |

OTHER PUBLICATIONS

Extended European Search Report for EP Appl. No. 11176037.7 dated Dec. 6, 2011.

*Primary Examiner* — Glenn Dayoan
*Assistant Examiner* — Melissa A Black
(74) *Attorney, Agent, or Firm* — Finnegan, Henderson, Farabow, Garrett & Dunner, LLP

(57) ABSTRACT

A bumper reinforcement having end portions in a width direction of a vehicle, includes a main wall extending in a first direction perpendicular to the width direction, first and second walls protruding from the main wall in the first direction to extend toward an interior side of the vehicle in a longitudinal direction of the vehicle, flanges protruding from respective ends of the first and second walls along the first direction, the main wall, the first and second walls, and the flanges being integrally formed with one another, and gradually narrowing portions formed, in the width direction, at end portions of each of the first and second walls, wherein respective protruding lengths of the first and second walls in the longitudinal direction gradually decrease from an intermediate portion of the bumper reinforcement to the end portions of the bumper reinforcement in the width direction to form the gradually narrowing portions.

7 Claims, 5 Drawing Sheets

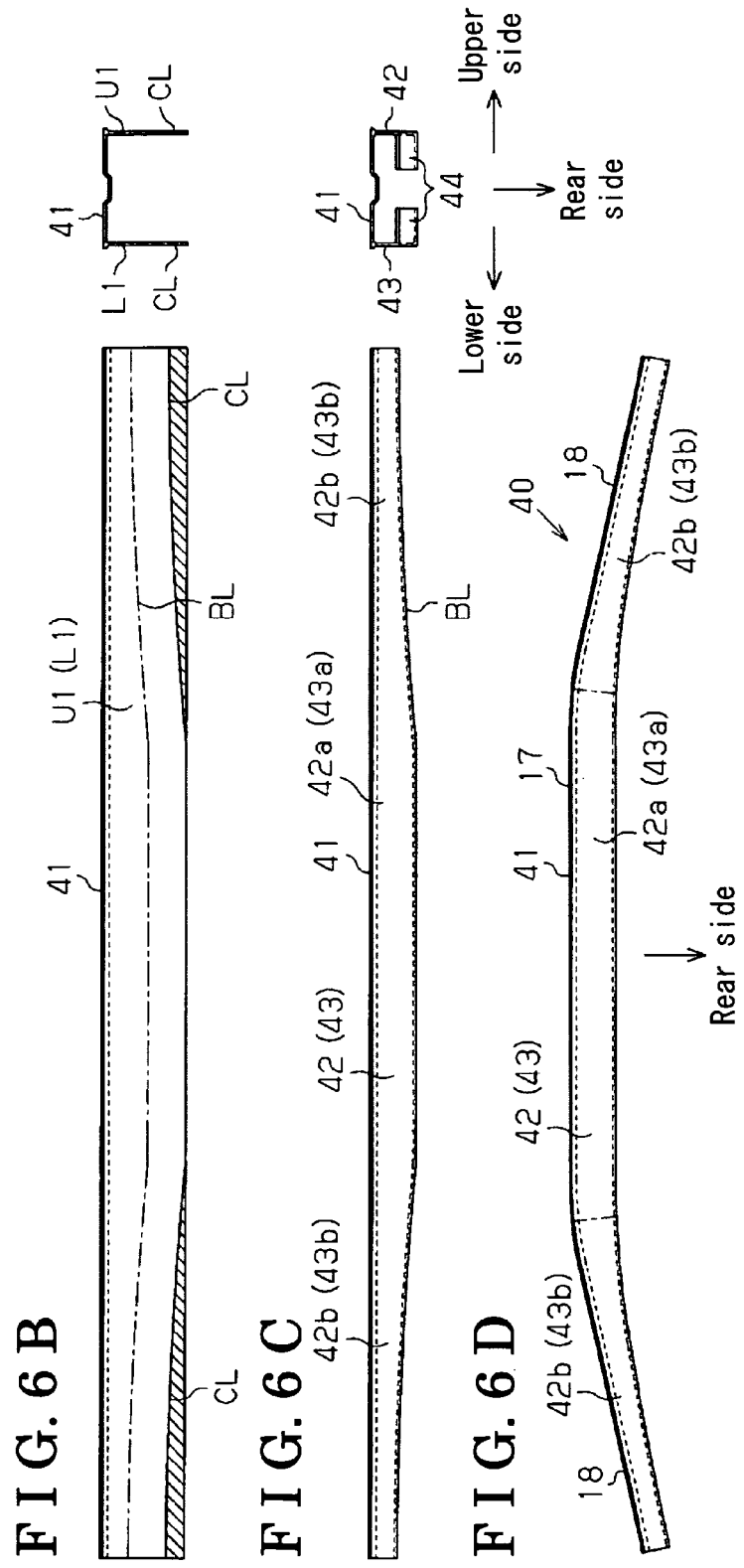

BUMPER REINFORCEMENT AND BUMPER DEVICE FOR VEHICLE

CROSS REFERENCE TO RELATED APPLICATIONS

This application is based on and claims priority under 35 U.S.C. §119 to Japanese Patent Application 2010-172980, filed on Jul. 30, 2010, the entire content of which is incorporated herein by reference.

TECHNICAL FIELD

This disclosure generally relates to a bumper reinforcement and a bumper device that are arranged at a vehicle such as an automobile.

BACKGROUND DISCUSSION

A known bumper reinforcement for a vehicle is disclosed in JP2006-151095A (hereinafter referred to as Reference 1). As illustrated in FIGS. 7A and 7B, a bumper reinforcement 91 includes a main body 92 formed by an extruded member extending in a width direction of the vehicle. Both end portions of the main body 92 in the width directions are curved toward a vehicle body and are diagonally cut. The bumper reinforcement 91 further includes a reinforcement member 93 having a groove portion. The reinforcement member 93 is attached from a front side of the vehicle to a cut surface of each of the end portions of the main body 92; thereby, an inclined surface conforming to a design of the vehicle may be obtained at the end portion of the main body 92 while the end portion is not excessively bent. In addition, bending strength of the main body 92 may deteriorate because a portion of the end portion of the main body 92 is diagonally cut. However, the reinforcement member 93 is attached to the end portion of the main body 92. Therefore, for example, in a case where the vehicle collides and an impact obliquely acts on the vehicle, the reinforcement 93 may secure a certain degree of resistance against energy of the impact caused by the collision.

Moreover, a known bumper reinforcement for a vehicle, disclosed in JP2000-334530A (hereinafter referred to as Reference 2) is integrally formed by pressing or another processing technique. The bumper reinforcement is designed so that a section width gradually decreases from end portions to an intermediate portion in a width direction of the vehicle in order to reduce an impact applied to an occupant of the vehicle due to a collision against a full-width portion of a front side of the vehicle. Thus, the bumper reinforcement designed as described above may absorb a large impact energy caused by the front collision while reducing the impact applied to the occupant.

According to the bumper reinforcement 91 described in Reference 1, the reinforcement member 93 having a predetermined bending strength is attached to the cut surface of the end portion of the main body 92 by welding or by a mechanical attaching technique. As a result, the number of components of the bumper reinforcement 91 and man-hours in a manufacturing process of the bumper reinforcement 91 increase and therefore result in cost increases.

According to Reference 2, the section width of the bumper reinforcement is smallest at the intermediate portion. Therefore, in a case where a concentrated load acts only on an intermediate portion of the vehicle in the width direction when the vehicle collides, the intermediate portion of the bumper reinforcement may easily fracture; therefore, the bumper reinforcement is deformed into a substantially V-shape.

A need thus exists for a bumper reinforcement and a bumper device for a vehicle, which are not susceptible to the drawback mentioned above.

SUMMARY

According to an aspect of this disclosure, a bumper reinforcement formed by an extruded member made of aluminum alloy and extending in a width direction of a vehicle, the bumper reinforcement including end portions in the width direction of the vehicle, the end portions being connected to a connecting member extending in a longitudinal direction of the vehicle, the bumper reinforcement, includes a main wall extending in a first direction perpendicular to the width direction, first and second walls protruding from first and second ends, respectively, of the main wall in the first direction to extend toward an interior side of the vehicle in the longitudinal direction, flanges protruding from respective ends of the first and second walls along the first direction to face each other, the respective ends being located at the interior side of the vehicle in the longitudinal direction, the main wall, the first and second walls, and the flanges being integrally formed with one another, and gradually narrowing portions formed at end portions of each of the first and second walls in the width direction, wherein respective protruding lengths of the first and second walls protruding toward the interior side of the vehicle in the longitudinal direction are designed to gradually decrease from an intermediate portion of the bumper reinforcement to the end portions of the bumper reinforcement in the width direction to form the gradually narrowing portions.

According to another aspect of the disclosure, a bumper reinforcement extending in a width direction of a vehicle and including end portions in the width direction of the vehicle, the end portions being connected to a connecting member extending in a longitudinal direction of the vehicle, the bumper reinforcement, includes a main wall including an aluminum alloy member formed by extrusion molding, the main wall extending in a first direction perpendicular to the width direction, first and second walls protruding from first and second ends, respectively, of the main wall in the first direction to extend toward an interior side of the vehicle in the longitudinal direction, and flanges protruding from respective ends of the first and second walls along the first direction to face each other, the respective ends being located at the interior side of the vehicle in the longitudinal direction, the main wall, the first and second walls, and the flanges being integrally formed with one another, wherein respective corner portions defined by the first wall and one of the flanges and by the second wall and the other one of the flanges are formed by pressing to gradually decrease respective protruding lengths of the first and second walls from the intermediate portion to the end portions of the bumper reinforcement in the width direction and to gradually increase respective protruding lengths of the flanges in the first direction in accordance with the decrease of the respective protruding lengths of the first and second walls.

According to still another aspect of the disclosure, a bumper device for a vehicle, includes a bumper reinforcement formed by an extruded member made of aluminum alloy and extending in a width direction of a vehicle, the bumper reinforcement having end portions in the width direction of the vehicle, the end portions being connected to a connecting member extending in a longitudinal direction of the vehicle, the bumper reinforcement having a main wall extending in a first direction perpendicular to the width direction, first and second walls protruding from first and second ends, respectively, of the main wall in the first direction to extend toward an interior side of the vehicle in the longitudinal direction, flanges protruding from respective ends of the first and second walls along the first direction to face each other, the respective ends being located at the interior side of the vehicle in the longitudinal direction, the main wall, the first and second walls, and the flanges being integrally formed with one another, and gradually narrowing portions formed at end portions of each of the first and second walls in the width direction, wherein respective protruding lengths of the first and second walls protruding toward the interior side of the vehicle in the longitudinal direction are designed to gradually decrease from an intermediate portion of the bumper reinforcement to the end portions of the bumper reinforcement in the width direction to form the gradually narrowing portions; and the connecting member including a pair of connecting members.

According to a further aspect of the disclosure, a bumper device for a vehicle includes, a bumper reinforcement extending in a width direction of a vehicle and having end portions in the width direction of the vehicle, the end portions being connected to a connecting member extending in a longitudinal direction of the vehicle, the bumper reinforcement having a main wall having an aluminum alloy member formed by extrusion molding, the main wall extending in a first direction perpendicular to the width direction, first and second walls protruding from first and second ends, respectively, of the main wall in the first direction to extend toward an interior side of the vehicle in the longitudinal direction, and flanges protruding from respective ends of the first and second walls along the first direction to face each other, the respective ends being located at the interior side of the vehicle in the longitudinal direction, the main wall, the first and second walls, and the flanges being integrally formed with one another, wherein respective corner portions defined by the first wall and one of the flanges and by the second wall and the other one of the flanges are formed by pressing to gradually decrease respective protruding lengths of the first and second walls from the intermediate portion to the end portions of the bumper reinforcement in the width direction and to gradually increase respective protruding lengths of the flanges in the first direction in accordance with the decrease of the respective protruding lengths of the first and second walls; and the connecting member including a pair of connecting members.

BRIEF DESCRIPTION OF THE DRAWINGS

The foregoing and additional features and characteristics of this disclosure will become more apparent from the following detailed description considered with the reference to the accompanying drawings, wherein:

FIG. 6A is a schematic view illustrating how to manufacture the bumper reinforcement according to the second embodiment disclosed here;

FIG. 6B is a schematic view illustrating how to manufacture the bumper reinforcement according to the second embodiment disclosed here;

FIG. 6C is a schematic view illustrating how to manufacture the bumper reinforcement according to the second embodiment disclosed here;

FIG. 6D is a schematic view illustrating how to manufacture the bumper reinforcement according to the second embodiment disclosed here;

DETAILED DESCRIPTION

Figure 3:
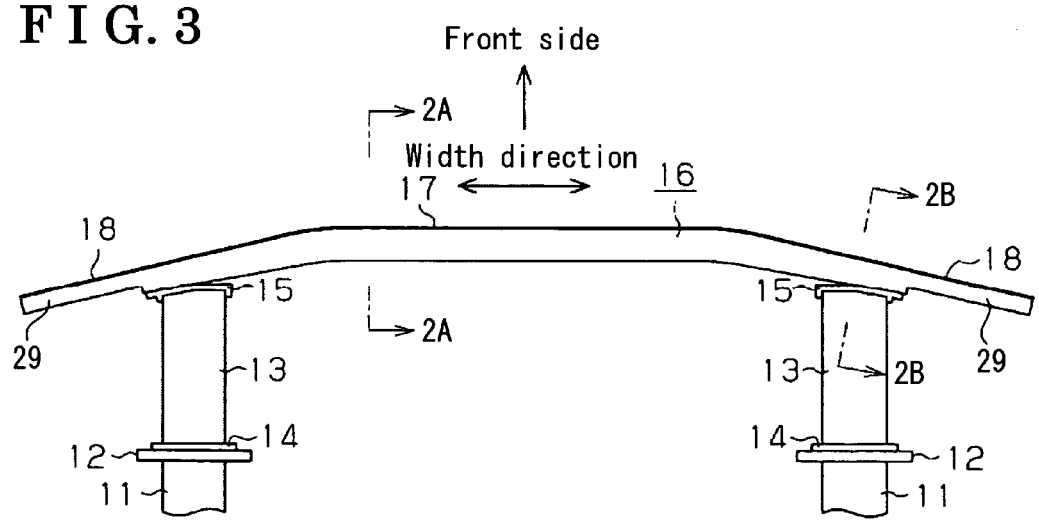
FIG. 3 is a plan view of the bumper reinforcement according to the first embodiment disclosed here.

A first embodiment of this disclosure will be described with reference to illustrations of the attached drawing as follows. A bumper device for a vehicle such as an automobile, according to the first embodiment is illustrated in a plan view of FIG. 3. As illustrated in FIG. 3, a pair of side members 11, for example, made of metal plates and extending along a longitudinal direction of the vehicle is arranged in a width direction of the vehicle. Each of the side members 11 corresponds to a hollow member having a substantially rectangular shape in cross section. The pair of side members 11 constitutes a portion of a vehicle body. Brackets 12 are welded to respective front ends of the side members 11 so as to close respective openings of the side members 11. Each of the brackets 12, for example, made of metal plates is formed into a substantially rectangular shape.

A pair of crush boxes 13 is attached to respective front surfaces of the brackets 12 welded to the side members 11. Each of the crush boxes 13 serving as connecting members is formed, for example, by an extruded member made of aluminum alloy. The crush box 13 corresponding to a hollow member having a substantially rectangular shape in cross section extends along the longitudinal direction. The crush box 13 has a central axis extending along the longitudinal direction. The crush box 13 is arranged so that the central axis is aligned with a central axis of the side member 11, which extends along the longitudinal direction. Brackets 14 are fixed to respective rear ends of the crush boxes 13 by bolts and nuts. For example, in a case where the vehicle collides, a load acts on each of the crush boxes 13 along the central axis. As a result, the pair of crush boxes 13 is permanently deformed and therefore absorbs impact energy caused by the collision.

Plates 15, for example, made of metal plates are fixed to respective front ends of the crush boxes 13 so as to close respective openings of the crush boxes 13. The plates 15 are connected to both end portions of a bumper reinforcement 16 extending in the width direction. The bumper reinforcement 16 is formed, for example, by an extruded member made of aluminum alloy. The bumper reinforcement 16 includes a linear portion 17 extending in the width direction, and inclined portions 18 continuously extending from respective ends of the linear portion 17 toward exterior sides of the vehicle in the width direction to be inclined toward a rear side of the vehicle. Boundary portions between one of the inclined portions 18 and one end of the linear portion 17 and between the other one of the inclined portions 18 and the other end of the liner portion 17 are symmetrically provided in the width direction. The inclined portion 18 is arranged at a front side of the crush box 13 in the longitudinal direction so as to face the crush box 13. A rear surface (at an interior side of the vehicle in the longitudinal direction) of the inclined portion 18, which is in the vicinity of the vehicle body, is configured to have an inclination conforming to an inclination of the front surface of the plate 15. The front surface of the plate 15 is in contact with the rear surface of the inclined portion 18. Thus, the end portions of the bumper reinforcement 16 and the crush boxes 13 are connected to one another via the contact portions between the inclined portions 18 and the plates 15.

Figure 1:
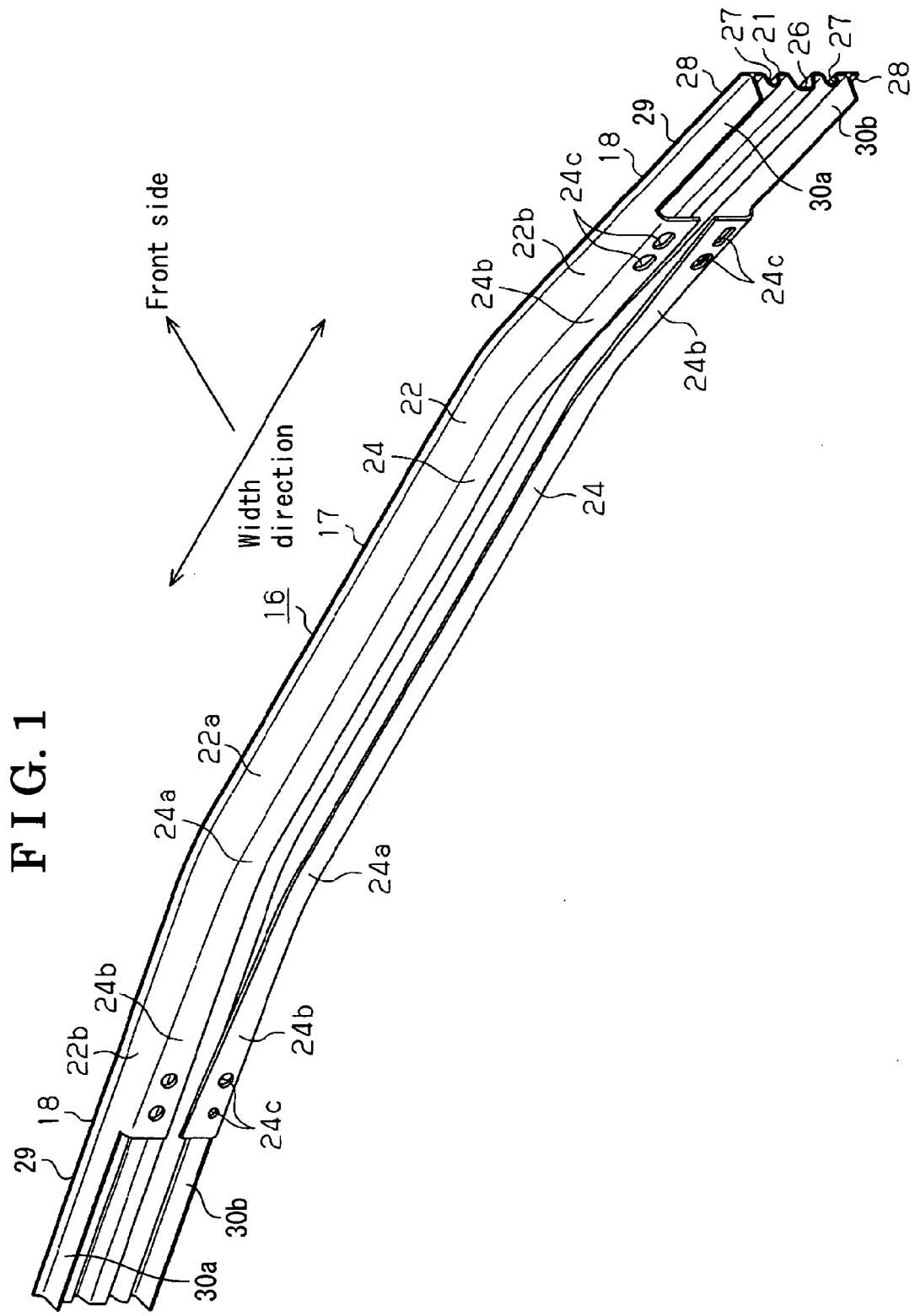
FIG. 1 is a perspective view of a bumper reinforcement for a vehicle, according to a first embodiment disclosed here.
Figure 2A:
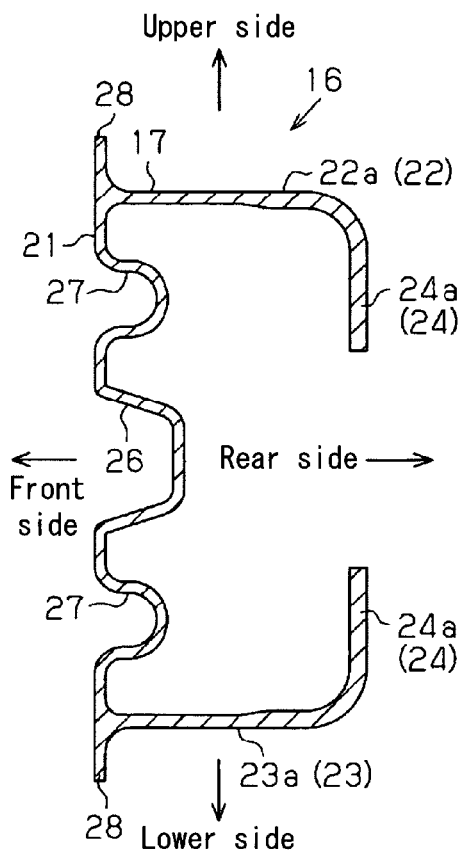
FIG. 2A is a cross-sectional view taken along the line 2A-2A in FIG. 3.
Figure 2B:
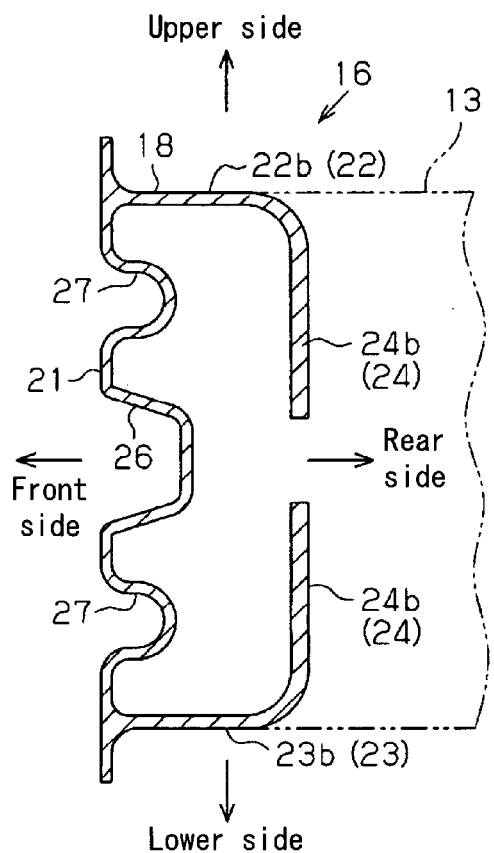
FIG. 2B is a cross-sectional view taken along the line 2B-2B in FIG. 3.

FIG. 1 is a perspective view of the bumper reinforcement 16. FIGS. 2A and 2B are cross-sectional views taken along the lines 2A-2A and 2B-2B, respectively, in FIG. 3. As illustrated in FIGS. 2A and 2B, the bumper reinforcement 16 integrally includes a main wall 21, upper and lower walls 22 and 23 (first and second walls), and flanges 24. The main wall 21 extends in a first direction perpendicular to the width direction of the vehicle (the first direction corresponds to a vertical direction of the vehicle). The upper wall 22 and the lower wall 23 protrude from upper and lower ends (first and second ends), respectively, of the main wall 21 toward the rear side of the vehicle (toward the interior side of the vehicle in the longitudinal direction). The flanges 24 facing each other in the vertical direction protrude downwardly and upwardly from rear ends (ends), respectively, of the upper and lower walls 22 and 23. In other words, the bumper reinforcement 16 has an open cross-sectional area having an approximately C-shape.

The main wall 21 has a substantially constant cross-sectional area in the entire length along the width direction. The main wall 21 includes a first bead 26, and a pair of second beads 27. The first bead 26 having a substantially U-shape recessed toward the rear side (toward the interior side of the vehicle in the longitudinal direction) is formed at an intermediate portion of the main wall 21 in the vertical direction. The second beads 27 having substantially U-shapes recessed toward the rear side (toward the interior side of the vehicle in the longitudinal direction) are formed at upper and lower sides of the first bead 26. The first bead 26 and the second beads 27 extend in an entire length of the bumper reinforcement 16 (in the entire length of the main wall 21) along the width direction (refer to FIG. 1). The first bead 26 and the second beads 27 increase bending strength of the main wall 21. In particular, in a case where the vehicle collides, the upper wall 22 and the lower wall 23 are inhibited by the pair of second beads 27 from expanding upwardly and downwardly from respective contact portions of the upper wall 22 and the lower wall 23 with the main wall 21. That is, the open cross-sectional area defined between the upper wall 22 and the lower wall 23 is inhibited by the pair of second beads 27 from expanding in the vertical direction.

The upper wall 22 and the lower wall 23 include first portions 22a and 23a, respectively, formed at the linear portion 17. The first portions 22a and 23a protrude from the linear portion 17 toward the rear side so as to have constant protruding lengths in the longitudinal direction. Further, the upper wall 22 includes gradually narrowing portions 22b formed at portions of the inclined portions 18, respectively, and the lower wall 23 includes gradually narrowing portions 23b formed at portions of the inclined portions 18, respectively (the gradually narrowing portions 22b are arranged at end portions of the upper wall 22 in the width direction and the gradually narrowing portions 23b are arranged at end portions of the lower wall 23 in the width direction). Respective protruding lengths of the upper wall 22 and the lower wall 23 gradually decrease from an intermediate portion of the bumper reinforcement 16 to the end portions of the bumper reinforcement 16 along the width direction; thereby, the gradually narrowing portions 22b and 23b are obtained. In the bumper reinforcement 16 according to the first embodiment, extending portions 29 extending toward the exterior sides of the vehicle along the width direction are formed at respective portions of the inclined portions 18, where the gradually narrowing portions 22b and 23b are not formed. One of the extending portions 29 connects to portions of one of the inclined portions 18, where the upper wall 22 and the lower wall 23 are formed. Likewise, the other one of the extending portions 29 connects to portions of the other one of the inclined portions 18, where the upper wall 22 and the lower wall 23 are formed. A second portion 30a is formed at the extending portion 29 connecting to the portion of the inclined portion 18, where the upper wall 22 is formed. The second portion 30a protrudes toward the rear side so as to have a constant length in the longitudinal direction. A second portion 30b is formed at the extending portion 29 connecting to the portion of the inclined portion 18, where the lower wall 23 is formed. Alternatively, the second portions 30a and 30b may be formed so as to constitute portions of the upper wall 22 and the lower wall 23, respectively.

Each of the flanges 24 includes a first flange portions 24a formed at the linear portion 17 and second flange portions 24b formed at the inclined portions 18, respectively. The first flange portions 24a protrude downwardly and upwardly from the respective rear ends of the upper wall 22 and the lower wall 23 so as to have constant protruding lengths in the vertical direction. The second flange portions 24b protrude downwardly and upwardly from the gradually narrowing portions 22b and 23b, respectively so as to have protruding lengths in the vertical direction. The protruding lengths of the second flange portions 24b are designed to gradually increase from the intermediate portion to the end portions of the bumper reinforcement 16 along the width direction. In other words, the protruding lengths of the second flange portions 24b in the vertical direction increase as the protruding lengths of the gradually narrowing portions 22b and 23b protruding toward the rear side of the vehicle decrease.

As described above, the bumper reinforcement 16 is configured so that the linear portion 17 includes a substantially constant cross-sectional area that is thickest in the longitudinal direction. In addition, the bumper reinforcement 16 is designed so that the respective portions of the inclined portions 18 gradually decrease from the intermediate portion to the end portions of the bumper reinforcement 16 along the width direction.

Bolt insertion bores 24c are formed in each of the second flange portions 24b so as to face the front side of the crush box 13. Threaded portions of bolts inserted in the respective bolt insertion bores 24c are screwed with nuts together with the bumper reinforcement 16 and the plate 15 to thereby fix the crush box 13 to the bumper reinforcement 16.

Further, the bumper reinforcement 16 integrally includes threaded protruding portions 28 protruding from respective connecting portions of the upper wall 22 and the lower wall 23 with the main wall 21 toward opposite sides from each other in the vertical direction. The threaded protruding portions 28 extend in the entire length of the bumper reinforcement 16 along the width direction. In other words, the threaded protruding portions 28 protrude in opposite directions from directions in which the flanges 24 protrude from the upper wall 22 and the lower wall 23, respectively. The threaded protruding portions 28 function to inhibit the open cross-sectional area between the upper wall 22 and the lower wall 23 from expanding in the vertical direction. In particular, the flanges 24 serve as inward flanges facing each other in the vertical direction and protruding in opposite directions from directions in which the open cross-sectional area expands, thereby further inhibiting the open cross-sectional area from expanding in the vertical direction.

An operation of the bumper reinforcement 16 according to the first embodiment will be explained as follows. For example, a front collision of the vehicle occurs and an impact thereby acts on the vehicle from a front side of the vehicle. At this time, the impact from the front side of the vehicle is transmitted through the bumper reinforcement 16 and the crush boxes 13 to the side members 11 (vehicle body). In the front collision of the vehicle, the crush boxes 13 are permanently deformed, thereby absorbing the impact transmitted to the vehicle body and an occupant of the vehicle.

As described above, the flanges 24 (inward flanges), the second beads 27, and the threaded protruding portions 28 are arranged at the bumper reinforcement 16, thereby inhibiting the open cross-sectional area between the upper wall 22 and the lower wall 23 from expanding in the vertical direction. On the other hand, the first bead 26 and the second beads 27 are arranged at the main wall 21, thereby increasing the bending strength of the main wall 21. Moreover, the crush boxes 13 are fixed to the flanges 24 (plates 15), thereby further increasing the bending strength compared to a case where the crush boxes 13 are fixed to the main wall portion 21. Thus, in the case of the front collision of the vehicle, the bumper reinforcement 16 receives a load applied to the vehicle due to the impact of the front collision without deteriorating the bending strength. As a result, the bumper reinforcement 16 may further absorb energy of the impact due to the front collision.

Figure 4:
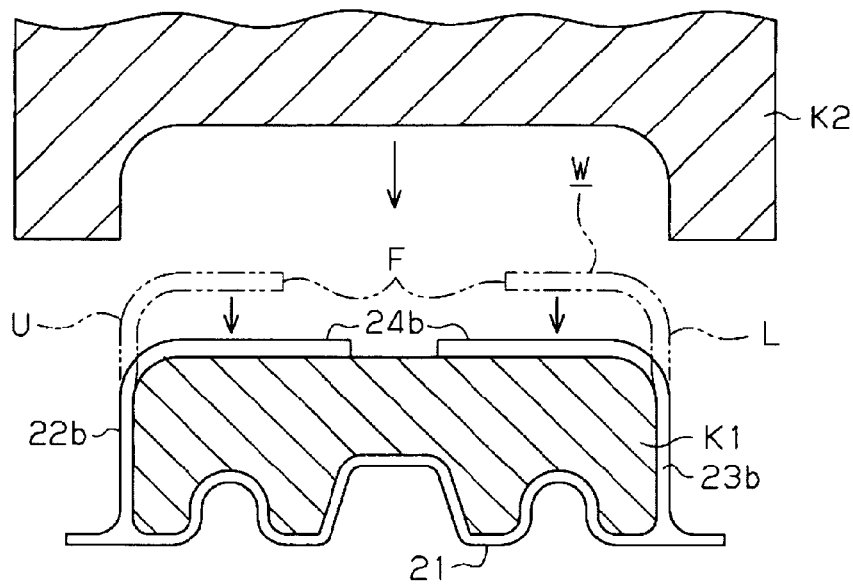
FIG. 4 is a cross-sectional view illustrating how to manufacture the bumper reinforcement according to the first embodiment disclosed here.

Next, how to manufacture the bumper reinforcement 16 will be explained as follows. As illustrated in FIG. 4, a work material W for the bumper reinforcement 16 has a shape formed by extrusion molding. The work material W having such shape corresponds to a bar-shaped member having a substantially C-shaped cross section in the entire length along the width direction. The substantially C-shaped cross section of the work material W corresponds to a shape of the linear portion 17. In other words, the work material W integrally includes an upper wall portion U, a lower wall portion L, and flanges F. The upper wall portion U has a cross section similar to a cross section of the first portion 22a. The lower wall portion L has a cross section similar to a cross section of the first portion 23a. The flanges F have cross sections similar to cross sections of the first flange portions 24a.

After the extrusion molding process for the work material W, a first die K1 having an outer wall surface conforming to an inner wall surface of the inclined portions 18 is attached within the work material W in a press process. In addition, a second die K2 is simultaneously pressed against the flanges F in a thickness direction of the work material W from an outer side of the flanges F to a downward direction indicated by arrows in FIG. 4. The second die K2 has an inner wall surface conforming to an outer wall surface of the inclined portion 18, which outer wall surface faces the rear side of the vehicle. In the aforementioned press process, a corner portion defined by the upper wall portion U and the flange F connecting to the upper wall portion U is formed by pressing and a corner portion defined by the lower wall portion L and the flange F connecting to the lower wall portion L is formed by pressing. Further, respective protruding lengths of the upper wall portion U and the lower wall portion L in a direction corresponding to the longitudinal direction of the vehicle are shortened (reduced), thereby forming the gradually narrowing portions 22b and 23b. Furthermore, respective protruding lengths of the flanges F in a direction corresponding to the vertical direction of the vehicle are extended (increased) in accordance with the reduction of the respective protruding lengths of the upper wall portion U and the lower wall portion L, thereby forming the second flange portions 24b. In addition, portions of the second flange portions 24b, which are provided at the further exterior sides in the width direction than connecting portions of the flanges 24b with the plates 15 (crush boxes 13), are cut out in order that the first die K1 within the bumper reinforcement 16 (work material W) may be easily removed therefrom after the aforementioned press process (see FIG. 1).

Thereafter, the work material W is bent or processed by another processing technique to form the linear portion 17 and the inclined portions 18; therefore, the bumper reinforcement 16 is completely formed. The bending process for the work material W may be conducted together with the press process. Alternatively, the bending process may be conducted together with a different process from the press process.

As described above, according to the first embodiment, following effects will be obtained. In the bumper device according to the first embodiment, protruding lengths of the end portions (at the inclined portions 18) of the upper wall 22 protruding toward the rear side and protruding lengths of the end portions of the lower wall 23 protruding toward the rear side gradually decrease from the intermediate portion to the end portions of the bumper reinforcement 16 along the width direction. As a result, the gradually narrowing portions 22b and 23b are obtained. Thus, the end portions of the bumper reinforcement 16 in the width direction may be further minimized, thereby expanding the versatility of the bumper reinforcement 16 relative to different designs of vehicles. In addition, the gradually narrowing portions 22b and 23b are not formed as a result of the permanent deformation behavior. That is, the gradually narrowing portions 22b and 23b are not formed as a result of buckling deformation of the upper wall 22 and the lower wall 23 under compression. Therefore, the bumper reinforcement 16 having the minimized size may be obtained. Additionally, the bumper reinforcement 16 having a sufficient strength depending on the shape may be obtained. As a result, for example, even in a case of an occurrence of an offset collision of the vehicle, i.e. in a case where an impact is applied to a portion of the front side of the vehicle when the vehicle collides, the inclined portions 18 of the bumper reinforcement 16 surely receive a load due to the offset collision. Meanwhile, the bumper reinforcement 16 is configured as a support beam having both end portions supported, for example, by the plates 15. The linear portion 17 corresponding to the intermediate portion of the bumper reinforcement 16 in the width direction is generally weak in strength. However, the protruding lengths of the upper and lower walls 22 and 23 protruding toward the rear side are longest at the linear portion 17. Accordingly, the bumper reinforcement 16 may sufficiently secure the bending strength. For example, even in a case where a concentrated load acts on the intermediate portion of the bumper reinforcement 16 due to the front collision of the vehicle, the intermediate portion of the bumper reinforcement 16 is inhibited from fracturing; therefore, the bumper reinforcement 16 is inhibited from being deformed into a substantially V-shape. In other words, according to a known bumper reinforcement having a constant cross-sectional area, the size of the known bumper reinforcement needs to be reduced so as to conform to different designs of vehicles. In addition, the thickness of the known bumper reinforcement and bending strength of an aluminum alloy for the known bumper reinforcement need to be increased in order that the known bumper reinforcement may secure a required strength. However, such countermeasures required for the known bumper reinforcement are not necessary for the bumper reinforcement 16 according to the first embodiment. Therefore, costs due to the increase of the weight of the bumper reinforcement 16 and due to additional materials for the bumper reinforcement 16 may be reduced. In particular, the bumper reinforcement 16 is integrally formed by the main wall 21, the upper wall 22, the lower wall 23, and the flanges 24, resulting in a reduction of components of the bumper reinforcement 16.

According to the first embodiment, the cross-sectional areas at the end portions of the bumper reinforcement 16 in the width direction are configured so that the protruding lengths of the gradually narrowing portions 22b and 23b protruding toward the rear side gradually decrease as the protruding lengths of the flanges 24 (second flange portions 24b) in the vertical direction gradually increase. That is, a distance between ends of the flanges 24 facing each other in the vertical direction gradually decreases from the intermediate portion to the end portions of the bumper reinforcement 16; therefore, each of the cross-sectional areas at the end portions of the bumper reinforcement 16 includes a substantially closed cross-sectional area. Thus, the aforementioned decrease of the protruding lengths of the gradually narrowing portions 22b and 23b in the longitudinal direction is offset by the aforementioned increase of the protruding lengths of the flanges 24 in the vertical direction. As a result, the strength of the bumper reinforcement 16 is inhibited from deteriorating. In addition, the versatility of the bumper reinforcement 16 relative to different designs of vehicles is expanded.

According to the first embodiment, the bending strength of the main wall 21 may be increased by the first bead 26 and the second beads 27. In addition, the open cross-sectional area between the upper wall 22 and the lower wall 23 is inhibited by the second beads 27 from vertically expanding and minimizing the deterioration of the strength of the bumper reinforcement 16.

According to the first embodiment, when the gradually narrowing portions 22b and 23b are formed by pressing, the second flange portions 24b are simultaneously formed. Moreover, according to the first embodiment, the threaded protruding portions 28 are formed at the respective connecting portions of the upper wall 22 and the lower wall 23 with the main wall 21, thereby inhibiting the open cross-sectional area from vertically expanding when the vehicle collides. In addition, the flanges 24 serve as the inward flanges facing each other in the vertical direction and protruding in the opposite directions from the directions in which the open cross-sectional area expands, thereby further inhibiting the open cross-sectional area from vertically expanding.

According to the first embodiment, the bumper reinforcement 16 is connected to the crush boxes 13 (plates 15) by the flanges 24 (second flange portions 24b). Consequently, for example, the load due to the collision of the vehicle may be received by the substantially rectangular cross-sectional areas of the crush boxes 13. As a result, the bending strength of the bumper reinforcement 16 is further increased compared to the case that the crush boxes 13 are fixed to the main wall 21 of the bumper reinforcement 16.

According to the first embodiment, the flanges 24 serve as the inward flanges. As a result, a cooling performance of a radiator is avoided from deteriorating while a flow of air flowing to the radiator is not disturbed by the flanges 24.

According to the first embodiment, the bumper reinforcement 16 may be formed with a combination of general process techniques such as extrusion molding, pressing, and the like.

A second embodiment of a bumper reinforcement 40 will be explained as follows with reference to illustrations of FIGS. 5A and 5B. Since the bumper reinforcement 40 according to the second embodiment differs from the bumper reinforcement 16 according to the first embodiment in the manufacturing process, explanations of similar configurations of the second embodiment to those of the first embodiment will be omitted.

Figure 5A:
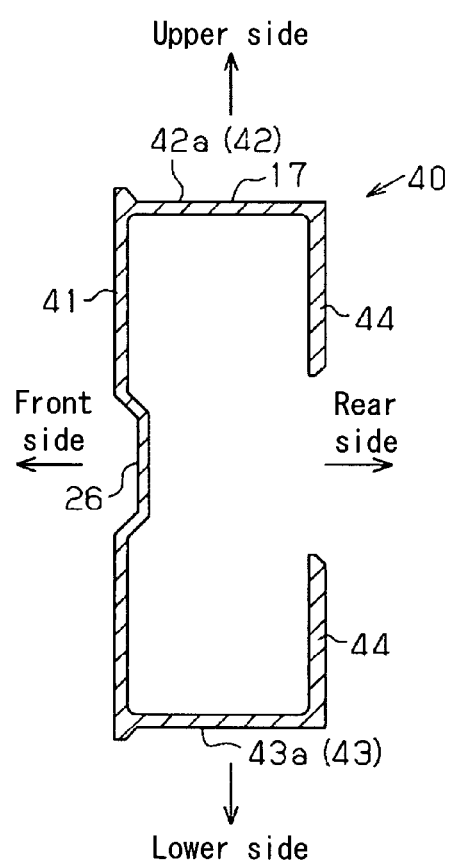
FIG. 5A is a cross-sectional view of the bumper reinforcement according to a second embodiment disclosed here.
Figure 5B:
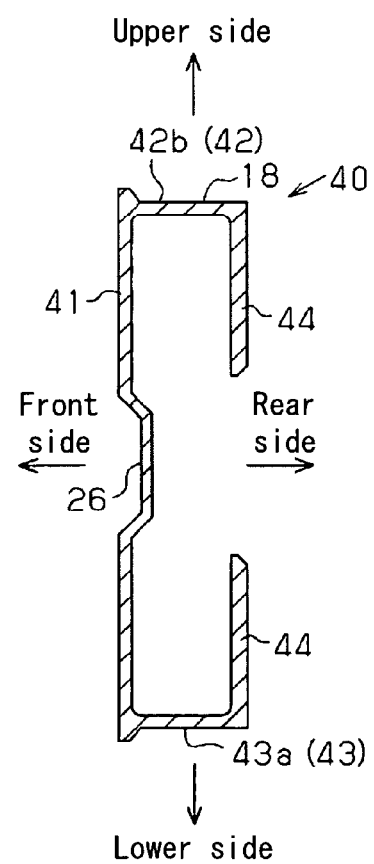
FIG. 5B is a cross-sectional view of the bumper reinforcement according to the second embodiment disclosed here.
Figure 7:
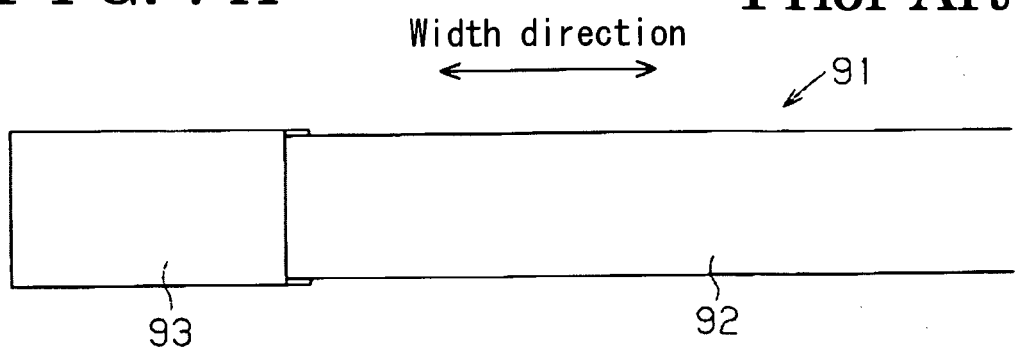
FIG. 7A is a front view of a known bumper reinforcement for a vehicle.
FIG. 7B is a plan view of the known bumper reinforcement.
Figure 7:
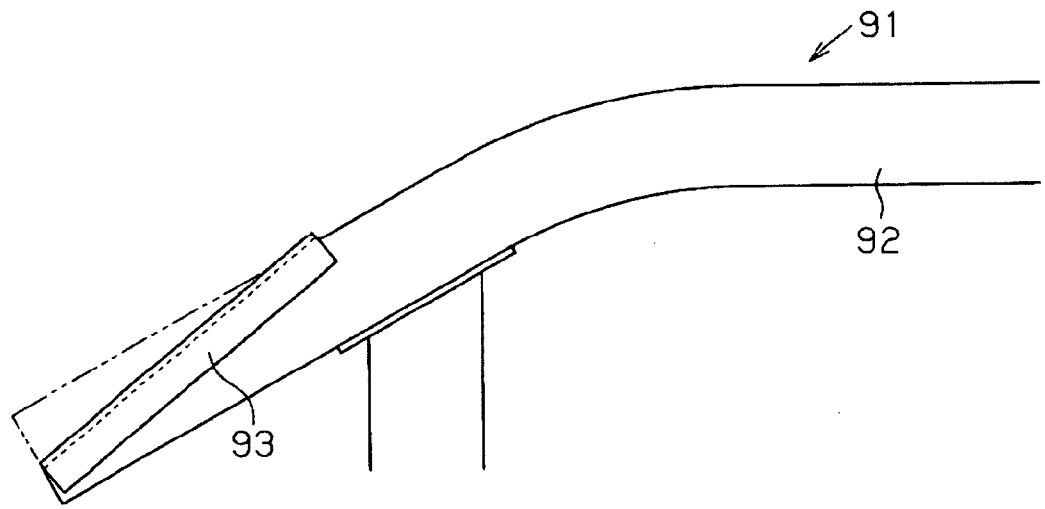

FIGS. 5A and 5B illustrate cross-sectional views of the bumper reinforcement 40 corresponding to the bumper reinforcement 16 illustrated in FIGS. 2A and 2B. As illustrated in FIGS. 5A and 5B, the bumper reinforcement 40 includes a main wall 41, upper and lower walls 42 and 43 (serving as the first and second walls), and flanges 44. As seen from FIGS. 5A and 5B, the second beads 27 of the first embodiment are not arranged at the main wall 41. The upper and lower walls 42 and 43 protrude from upper and lower ends (serving as the first and second ends) of the main wall 41 toward the rear side of the vehicle (toward the interior side of the vehicle in the longitudinal direction). Similarly as in the first embodiment, the upper and lower walls 42 and 43 include first portions 42a and 43a, respectively, formed at the linear portion 17. The first portions 42a and 43a protrude from the linear portion 17 toward the rear side so as to have constant protruding lengths in the longitudinal direction. Further, the upper wall 42 includes gradually narrowing portions 42b formed at the inclined portions 18, respectively, and the lower wall 43 includes gradually narrowing portions 43b formed at the inclined portions 18, respectively (the gradually narrowing portions 42b are formed at end portions of the upper wall 42 in the width direction and the gradually narrowing portions 43b are formed at end portions of the lower wall 43 in the width direction). Protruding lengths of the gradually narrowing portions 42b protruding toward the rear side and protruding lengths of the gradually narrowing portions 43b protruding toward the rear side are designed to gradually decrease from an intermediate portion to end portions of the bumper reinforcement 40 along the width direction. As a result, the gradually narrowing portions 42b and 43b are obtained. In addition, the flanges 44 facing each other in the vertical direction protrude downwardly and upwardly from rear ends (ends) of the upper and lower walls 42 and 43. Protruding lengths of the flanges 44 protruding from the upper and lower walls 42 and 43 along the vertical direction are designed to be constant in the entire length of the bumper reinforcement 40 along the width direction.

Next, how to manufacture the bumper reinforcement 40 according to the second embodiment will be described as follows. A work material W1 made of aluminum alloy for the bumper reinforcement 40 has a shape formed by extrusion molding. As seen in cross section, the work material W1 integrally includes the main wall 41, upper and lower wall portions U1 and L1 protruding from the upper and lower ends of the main wall 41, respectively, toward the rear side. In other words, the work material W1 corresponds to a bar-shaped member including an open cross-sectional area having a substantially U-shape over the entire length along the width direction.

After the extrusion molding process for the work material W1, as illustrated in FIG. 6B, both end portions of each of the upper and lower wall portions U1 and L1 in the width direction are cut along cutting-plane lines CL in a cutting process. Therefore, a protruding length of the upper wall portion U1 protruding toward the rear side is decreased toward both edges in the width direction. Likewise, a protruding length of the lower wall portion L1 protruding toward the rear side is decreased toward both edges in the width direction.

After the cutting process for the work material W1, as illustrated in FIG. 6C, the upper and lower wall portions U1 and L1 facing each other in the vertical direction are bent downwardly and upwardly along flange bending lines BL in a press process. The flange bending lines BL extend in a parallel manner along respective outer shapes of the upper and lower wall portions U1 and L1, which are defined to face the rear side of the vehicle. As described above, the upper wall 42 (first portion 42a, gradually narrowing portions 42b), the lower wall 43 (first portion 43a, gradually narrowing portions 43b), and the flanges 44 are completely formed.

After the press process for the work material W1, as illustrated in FIG. 6D, the work material W1 is bent at boundary positions of the gradually narrowing portions 42b relative to the first portion 42a and at boundary positions of the gradually narrowing portions 43b relative to the first portion 43a, thereby forming the linear portion 17 and the inclined portions 18. As a result, the bumper reinforcement 40 is completely formed.

As described above, in addition to the effects of the bumper reinforcement 16 according to the first embodiment, following effects are obtained by the bumper reinforcement 40 according to the second embodiment. According to the second embodiment, the cross-sectional area of the work material W1 (extruded member) has a simple shape and may be therefore easily formed, resulting in a reduction of man-hours of the extrusion molding process.

According to the second embodiment, the upper wall 42 (first portion 42a, gradually narrowing portions 42b), the lower wall 43 (first portion 43a, gradually narrowing portions 43b), and the flanges 44 may be simultaneously formed from the upper wall portion U1 and the lower wall portion L1 by pressing (the press process).

According to the second embodiment, bending strength of the main wall 41 may be increased by the first bead 26.

In addition, the bumper device 16, 40 according to each of the first and second embodiments may be modified as follows. In each of the first and second embodiments, the gradually narrowing portions 22b and 23b, 42b and 43b are unnecessarily formed so as to conform to an inclination of each of the inclined portions 18. For example, the gradually narrowing portions 22b and 23b, 42b and 43b may be formed so as to extend in the entire length of the bumper reinforcement 16, 40 (upper and lower walls 22 and 23, 42 and 43), i.e. the gradually narrowing portions 22b and 23b, 42b and 43b may be formed so as to extend from the intermediate portion to the end portions of the bumper reinforcement 16, 40 in the width direction.

Further, according to each of the first and second embodiments, the main wall 21, 41 may be curved into an arch or a substantially M-shape in cross section as long as the cross-sectional area of the main wall 21, 41 extends along the vertical direction. Furthermore, according to each of the first and second embodiments, the crush boxes 13 (plates 15) may be fixed to the main wall 21, 41 so as to be inserted between the flanges 24, 44 in the vertical direction.

According to each of the first and second embodiments, the crush boxes 13 may be excluded from the bumper reinforcement 16, 40. Instead, the side members 11 may be directly connected to the bumper reinforcement 16, 40. The bumper reinforcement 16, 40 according to each of the first and second embodiments may be adapted to a rear portion of the vehicle.

As described above, according to the first and second embodiments, the bumper reinforcement 16, 40 formed by the extruded member made of aluminum alloy and extending in the width direction of the vehicle, the bumper reinforcement 16, 40 including the end portions in the width direction of the vehicle, the end portions being connected to the crush boxes 13 extending in the longitudinal direction of the vehicle, the bumper reinforcement 16, 40 includes the main wall 21, 41 extending in the vertical direction, the upper and lower walls 22, 42 and 23, 43 protruding from the upper and lower ends of the main wall 21, 41 in the vertical direction to extend toward the rear side, the flanges 24, 44 protruding from the respective rear ends of the upper and lower walls 22, 42 and 23, 43 along the vertical direction to face each other, the respective rear ends being located at the interior side of the vehicle in the longitudinal direction, the main wall 21, 41, the upper and lower walls 22, 42 and 23, 43, and the flanges 24, 44 being integrally formed with one another, and the gradually narrowing portions 22b, 42b and 23b, 43b formed at the end portions of each of the upper and lower walls 22, 42 and 23, 43 in the width direction, wherein the respective protruding lengths of the upper and lower walls 22, 42 and 23, 43 protruding toward the rear side are designed to gradually decrease from the intermediate portion to the end portions of the bumper reinforcement 16, 40 in the width direction to form the gradually narrowing portions 22b, 42b and 23b, 43b.

According to the aforementioned configuration of the bumper reinforcement 16, 40, the protruding lengths of the end portions of the upper wall 22, 42 protruding toward the rear side and the protruding lengths of the end portions of the lower wall 23, 43 protruding toward the rear side gradually decrease from the intermediate portion to the end portions of the bumper reinforcement 16, 40 along the width direction. As a result, the gradually narrowing portions 22b, 42b and 23b, 43b are obtained. In addition, the end portions of the bumper reinforcement 16, 40 in the width direction may be further minimized, thereby expanding the versatility of the bumper reinforcement 16, 40 relative to different designs of vehicles. Meanwhile, the bumper reinforcement 16, 40 is configured as the support beam having the both end portions supported, for example, by the plates 15. The intermediate portion of the bumper reinforcement 16, 40 in the width direction is generally weak in strength. However, the protruding lengths of the upper and lower walls 22, 42 and 23, 43 protruding toward the rear side are longest at the intermediate portion. Accordingly, the bumper reinforcement 16, 40 may sufficiently secure the bending strength. For example, even in a case where the concentrated load acts on the intermediate portion of the bumper reinforcement 16, 40 due to the front collision of the vehicle, the intermediate portion of the bumper reinforcement 16, 40 is inhibited from fracturing; therefore, the bumper reinforcement 16, 40 is inhibited from being deformed into the substantially V-shape. In particular, the bumper reinforcement 16, 40 is integrally formed by the main wall 21, 41, the upper wall 22, 42, the lower wall 23, 43, and the flanges 24, 44, resulting in a reduction of components of the bumper reinforcement 16.

According to the first and second embodiments, the respective protruding lengths of the flanges 24, 44 protruding along the vertical direction increase as the respective protruding lengths of the gradually narrowing portions 22, 42 and 23, 43 extending toward the rear side gradually decrease from the intermediate portion to the end portions of the bumper reinforcement 16, 40 in the width direction.

Accordingly, the cross-sectional areas at the end portions of the bumper reinforcement 16, 40 in the width direction are configured so that the protruding lengths of the gradually narrowing portions 22b, 42b and 23b, 43b protruding toward the rear side gradually decrease as the protruding lengths of the flanges 24, 44 in the vertical direction gradually increase. That is, the distance between the ends of the flanges 24 facing each other in the vertical direction gradually decreases from the intermediate portion to the end portions of the bumper reinforcement 16, 40; therefore, each of the cross-sectional areas at the end portions of the bumper reinforcement 16, 40 includes the substantially closed cross-sectional area. Thus, the aforementioned decrease of the protruding lengths of the gradually narrowing portions 22b, 42b and 23b, 43b in the longitudinal direction is offset by the aforementioned increase of the protruding lengths of the flanges 24, 44 in the vertical direction. As a result, the strength of the bumper reinforcement 16, 40 is inhibited from deteriorating. In addition, the versatility of the bumper reinforcement 16, 40 relative to different designs of vehicles is expanded.

According to the first embodiment, the bumper reinforcement 16 further includes the first bead 26 formed at the intermediate portion of the main wall 21 in the vertical direction to protrude from the main wall 21 toward the rear side, and the second beads 27 formed at the upper and lower sides of the first bead 26 to protrude from the main wall 21 toward the rear side. The first bead 26 extends in the entire length of the main wall 21 along the width direction. The second beads 27 extend in the entire length of the main wall 21 along the width direction.

The bending strength of the main wall 21 may be increased by the first bead 26 and the second beads 27. In addition, the open cross-sectional area between the upper wall 22 and the lower wall 23 is inhibited by the second beads 27 from vertically expanding and minimizing the deterioration of the strength of the bumper reinforcement 16.

According to the first embodiment, the respective corner portions defined by the upper wall 22 and one of the flanges 24 and by the lower wall 23 and the other one of the flanges 24 are formed by pressing to gradually decrease the respective protruding lengths of the upper and lower walls 22 and 23 from the intermediate portion to the end portions of the bumper reinforcement 16 in the width direction and to gradually increase respective protruding lengths of the flanges 24 in the vertical direction in accordance with the decrease of the respective protruding lengths of the upper and lower walls 22 and 23.

According to the aforementioned configuration of the bumper reinforcement 16, the protruding lengths of the end portions of the upper wall 22 protruding toward the rear side and the protruding lengths of the end portions of the lower wall 23 protruding toward the rear side gradually decrease from the intermediate portion to the end portions of the bumper reinforcement 16 along the width direction. As a result, the gradually narrowing portions 22b and 23b are obtained. Thus, the end portions of the bumper reinforcement 16 in the width direction may be further minimized, thereby expanding the versatility of the bumper reinforcement 16 relative to different designs of vehicles. Meanwhile, the bumper reinforcement 16 is configured as the support beam having the both end portions supported, for example, by the plates 15. The intermediate portion of the bumper reinforcement 16 in the width direction is generally weak in strength. However, the protruding lengths of the upper and lower walls 22 and 23 protruding toward the rear side are longest at the intermediate portion. Accordingly, the bumper reinforcement 16 may sufficiently secure the bending strength. For example, even in a case where the concentrated load acts on the intermediate portion of the bumper reinforcement 16 due to the front collision of the vehicle, the intermediate portion of the bumper reinforcement 16 is inhibited from fracturing; therefore, the bumper reinforcement 16 is inhibited from being deformed into the substantially V-shape. In addition, the cross-sectional areas at the end portions of the bumper reinforcement 16 in the width direction are configured so that the protruding lengths of the gradually narrowing portions 22b and 23b protruding toward the rear side gradually decrease as the protruding lengths of the flanges 24 in the vertical direction gradually increase. That is, the distance between the ends of the flanges 24 facing each other in the vertical direction gradually decreases from the intermediate portion to the end portions of the bumper reinforcement 16; therefore, each of the cross-sectional areas at the end portions of the bumper reinforcement 16 includes the substantially closed cross-sectional area. Thus, the aforementioned decrease of the protruding lengths of the gradually narrowing portions 22b and 23b in the longitudinal direction is offset by the aforementioned increase of the protruding lengths of the flanges 24 in the vertical direction. As a result, the strength of the bumper reinforcement 16 is inhibited from deteriorating. In addition, the versatility of the bumper reinforcement 16 relative to different designs of vehicles is expanded. In particular, the bumper reinforcement 16 is integrally formed by the main wall 21, the upper wall 22, the lower wall 23, and the flanges 24, resulting in a reduction of components of the bumper reinforcement 16.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A bumper reinforcement formed by an extruded member made of aluminum alloy and extending in a width direction of a vehicle, the bumper reinforcement including end portions in the width direction of the vehicle, the end portions being connected to a connecting member extending in a longitudinal direction of the vehicle, the bumper reinforcement comprising:

a main wall extending in a first direction perpendicular to the width direction;

first and second walls protruding from first and second ends, respectively, of the main wall in the first direction to extend toward an interior side of the vehicle in the longitudinal direction;

flanges protruding from respective ends of the first and second walls along the first direction to face each other, the respective ends being located at the interior side of the vehicle in the longitudinal direction;

the main wall, the first and second walls, and the flanges being integrally formed with one another, and gradually narrowing portions formed, in the width direction, at end portions of each of the first and second walls;

wherein respective protruding lengths of the first and second walls protruding toward the interior side of the vehicle in the longitudinal direction are designed to gradually decrease from an intermediate portion of the bumper reinforcement to the end portions of the bumper reinforcement in the width direction to form the gradually narrowing portions; and wherein respective protruding lengths of the flanges protruding along the first direction increase as respective protruding lengths of the gradually narrowing portions extending toward the interior side of the vehicle in the longitudinal direction gradually decrease from the intermediate portion to the end portions of the bumper reinforcement in the width direction.

2. The bumper reinforcement according to claim 1, further comprising a first bead formed at an intermediate portion of the main wall in the first direction to protrude from the main wall toward the interior side of the vehicle in the longitudinal direction, the first bead extending in an entire length of the main wall along the width direction; and second beads formed at upper and lower sides of the first bead to protrude from the main wall toward the interior side of the vehicle in the longitudinal direction, the second beads extending in the entire length of the main wall along the width direction.

3. The bumper reinforcement according to claim 1, wherein the connecting member includes a pair of connecting members.

4. A bumper reinforcement extending in a width direction of a vehicle and including end portions in the width direction of the vehicle, the end portions being connected to a connecting member extending in a longitudinal direction of the vehicle, the bumper reinforcement comprising:

a main wall including an aluminum alloy member formed by extrusion molding, the main wall extending in a first direction perpendicular to the width direction;

first and second walls protruding from first and second ends, respectively, of the main wall in the first direction to extend toward an interior side of the vehicle in the longitudinal direction; and flanges protruding from respective ends of the first and second walls along the first direction to face each other, the respective ends being located at the interior side of the vehicle in the longitudinal direction;

the main wall, the first and second walls, and the flanges being integrally formed with one another;

wherein respective corner portions defined by the first wall and one of the flanges and by the second wall and the other one of the flanges are formed by pressing to gradually decrease respective protruding lengths of the first and second walls from the intermediate portion to the end portions of the bumper reinforcement in the width direction and to gradually increase respective protruding lengths of the flanges in the first direction in accordance with the decrease of the respective protruding lengths of the first and second walls.

5. The bumper reinforcement according to claim 4, wherein the connecting member includes a pair of connecting members.

6. A bumper device for a vehicle, comprising:

a bumper reinforcement formed by an extruded member made of aluminum alloy and extending in a width direction of a vehicle, the bumper reinforcement having end portions in the width direction of the vehicle, the end portions being connected to a connecting member extending in a longitudinal direction of the vehicle, the bumper reinforcement including a main wall extending in a first direction perpendicular to the width direction, first and second walls protruding from first and second ends, respectively, of the main wall in the first direction to extend toward an interior side of the vehicle in the longitudinal direction, flanges protruding from respective ends of the first and second walls along the first direction to face each other, the respective ends being located at the interior side of the vehicle in the longitudinal direction, the main wall, the first and second walls, and the flanges being integrally formed with one another, and gradually narrowing portions formed, in the width direction, at end portions of each of the first and second walls, wherein respective protruding lengths of the first and second walls protruding toward the interior side of the vehicle in the longitudinal direction are designed to gradually decrease from an intermediate portion of the bumper reinforcement to the end portions of the bumper reinforcement in the width direction to form the gradually narrowing portions;

the connecting member including a pair of connecting members; and wherein respective protruding lengths of the flanges protruding along the first direction increase as respective protruding lengths of the gradually narrowing portions extending toward the interior side of the vehicle in the longitudinal direction gradually decrease from the intermediate portion to the end portions of the bumper reinforcement in the width direction.

7. A bumper device for a vehicle comprising:

a bumper reinforcement extending in a width direction of a vehicle and having end portions in the width direction of the vehicle, the end portions being connected to a connecting member extending in a longitudinal direction of the vehicle, the bumper reinforcement including a main wall having an aluminum alloy member formed by extrusion molding, the main wall extending in a first direction perpendicular to the width direction, first and second walls protruding from first and second ends, respectively, of the main wall in the first direction to extend toward an interior side of the vehicle in the longitudinal direction, and flanges protruding from respective ends of the first and second walls along the first direction to face each other, the respective ends being located at the interior side of the vehicle in the longitudinal direction, the main wall, the first and second walls, and the flanges being integrally formed with one another, wherein respective corner portions defined by the first wall and one of the flanges and by the second wall and the other one of the flanges are formed by pressing to gradually decrease respective protruding lengths of the first and second walls from the intermediate portion to the end portions of the bumper reinforcement in the width direction and to gradually increase respective protruding lengths of the flanges in the first direction in accordance with the decrease of the respective protruding lengths of the first and second walls; and the connecting member including a pair of connecting members.

* * * * *